(12) United States Patent
Bach et al.

(10) Patent No.: US 8,251,038 B2
(45) Date of Patent: Aug. 28, 2012

(54) CYLINDER HEAD ROCKER ARM STAND REPAIR INSERT

(75) Inventors: Christopher Bach, Chillicothe, IL (US); Curtis Graham, Peoria, IL (US); Trent Simpson, Peoria, IL (US); Michael Bridges, Iuka, MS (US)

(73) Assignee: Caterpillar Inc., Peoria, IL (US)

( * ) Notice: Subject to any disclaimer, the term of this patent is extended or adjusted under 35 U.S.C. 154(b) by 217 days.

(21) Appl. No.: 12/839,960

(22) Filed: Jul. 20, 2010

(65) Prior Publication Data

US 2012/0017862 A1 Jan. 26, 2012

(51) Int. Cl.
*F01L 1/18* (2006.01)

(52) U.S. Cl. .................. 123/193.5; 123/90.39

(58) Field of Classification Search .............. 123/193.5, 123/90.39–90.47
See application file for complete search history.

(56) References Cited

U.S. PATENT DOCUMENTS

| | | | |
|---|---|---|---|
| 1,469,489 A | 10/1923 | Manville | |
| 2,287,182 A | 6/1942 | Leake | |
| 4,086,887 A | 5/1978 | Schoonover et al. | |
| 4,655,177 A | 4/1987 | Wells et al. | |
| 4,718,379 A | 1/1988 | Clark | |
| 5,095,861 A * | 3/1992 | Dove, Jr. | 123/90.39 |
| 5,617,818 A * | 4/1997 | Luders | 123/90.27 |
| 5,636,600 A | 6/1997 | Sweetland et al. | |
| 5,711,260 A | 1/1998 | Aupperle et al. | |
| 6,178,937 B1 * | 1/2001 | Solomon et al. | 123/90.41 |
| 6,230,676 B1 | 5/2001 | Pryba et al. | |
| 6,267,090 B1 | 7/2001 | Schneider | |
| 6,293,238 B1 | 9/2001 | Harmon | |
| 6,557,507 B2 | 5/2003 | Rosenbush et al. | |
| 7,409,939 B2 | 8/2008 | Hughes et al. | |
| 2005/0022768 A1 * | 2/2005 | Tores et al. | 123/90.41 |

FOREIGN PATENT DOCUMENTS

| | | |
|---|---|---|
| JP | 06206129 | 7/1994 |
| JP | 2007192103 | 8/2007 |
| JP | 2008057505 | 3/2008 |
| KR | 2019980040915 | 9/1998 |
| KR | 2019990030522 | 7/1999 |

* cited by examiner

*Primary Examiner* — M. McMahon
(74) *Attorney, Agent, or Firm* — Leydig, Voit & Mayer (57) ABSTRACT

An insert for use in a remanufactured cylinder head rocker arm stand, the insert comprising an inner facing surface having a radius within a range of 35 to 45 mm and a length within a range of 70 to 103 mm, and an outer facing surface adapted for disposal against a channel in the rocker arm stand, the rocker arm shaft being disposed adjacent the inner facing surface in use, but not adjacent the rocker arm stand.

20 Claims, 7 Drawing Sheets

CYLINDER HEAD ROCKER ARM STAND REPAIR INSERT

TECHNICAL FIELD

This patent disclosure relates generally to internal combustion engines and, more particularly to an insert for use in remanufacturing cylinder head of an internal combustion engine.

BACKGROUND

Internal combustion engines, such as multi-cylinder diesel engines, typically include a crankshaft, a camshaft and a rocker arm shaft. The crankshaft is connected with a plurality of piston rods, which in turn are connected with a plurality of corresponding pistons. Reciprocating movement of the pistons within corresponding combustion cylinders causes rotation of the crankshaft.

Generally, the crankshaft is interconnected with the camshaft via a gear set and thereby rotatably drives the camshaft during operation. The camshaft includes a plurality of cams, with each cam being associated with an inlet valve, and an exhaust valve or a fuel injector valve. More particularly, the rocker arm shaft carries a plurality of rocker arms, with each rocker arm having a roller follower, which engages a corresponding cam on the camshaft. Rotation of the camshaft causes oscillatory pivotal movement of the rocker arms about the rocker arm shaft.

In overhead cam engines, rocker arm stands typically are built into the cylinder head casting. The rocker arm shaft it then secured to the stands, the rocker arms pivoting around the stationary rocker arm shaft. Although the rocker arms pivot through a relatively small pivoting angle about the stationary rocker arm shaft, this pivoting may not be sufficient to allow the formation of a hydrodynamic oil film between the rocker arms and the rocker arm shaft. As a result, the friction between the rocker arms and the rocker arm shaft may be relatively high, causing increased wear or spalling between the rocker arms and the rocker arm shaft. Additionally, the movement of the rocker arm shaft and rocker arms may likewise cause damage to the rocker arm stands themselves. Excessive wear can cause inefficient operation of the engine, necessitating replacement of the entire cylinder head casting.

In order to minimize wear, various arrangements have been proposed to increase lubrication and/or reduce friction between the rocker arms and the rocker arm shaft. These proposals are often not entirely effective, or are of relatively high cost to facilitate. For example, it is known to oscillate a rocker arm shaft through a small rotational angle using a rack and pinion arrangement in order to change the eccentricity of the rocker arms relative to the rocker arm shaft. The arrangement disclosed in U.S. Pat. No. 4,718,379 to Clark provides a roller bearing pivot assembly between the shaft and the rocker arm. The retrofit roller bearing pivot assembly about the top of a spacer member, which forms the rocker arm shaft, the assembly extending along the sides of the spacer member. Of these proposals, however, neither repairs prior damage nor wear.

The present disclosure is directed to overcoming one or more of the problems as set forth above.

SUMMARY

The disclosure describes, in one aspect, an insert for use in a remanufactured cylinder head for an internal combustion engine. The cylinder head adapted to receive a rocker arm shaft to which at least one rocker arm is mounted. The cylinder head comprises at least one rocker arm stand including a channel. The insert is adapted to be secured within the channel. The insert comprises an inner facing surface for receiving the rocker arm shaft and an outer facing surface, at least a portion of the outer facing surface being adapted for disposal against the channel. The inner facing surface has a radius and a length, the radius being within a range of 35 to 45 mm, the length being within a range of 70 to 103 mm. The outer facing surface is adapted to cover a surface of the rocker arm stand such that the rocker arm shaft is disposed adjacent the inner facing surface in use, but not adjacent the rocker arm stand.

DETAILED DESCRIPTION

Figure 1:
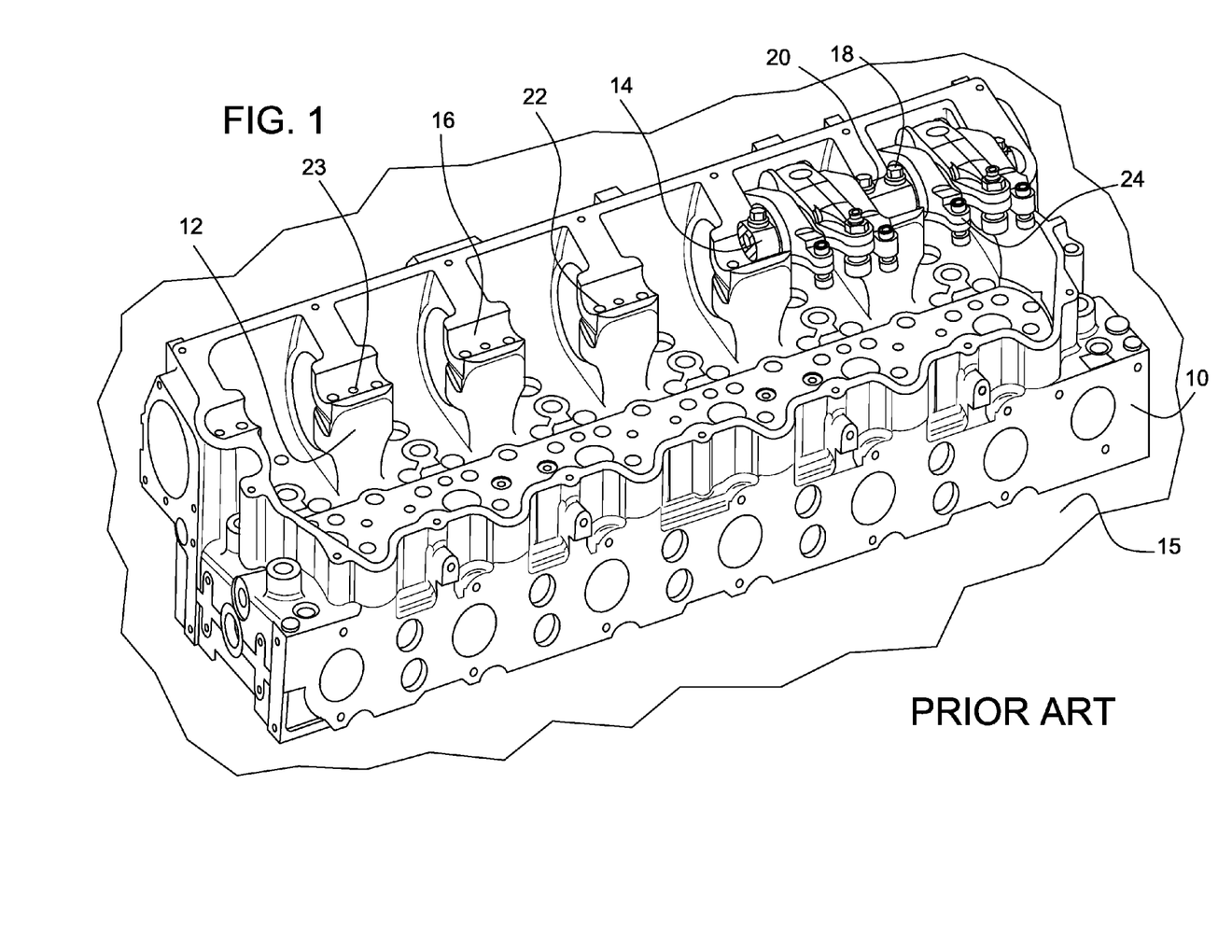
FIG. 1 is an isometric view of a prior art cylinder head casting including a plurality of rocker arms and a rocker arm shaft.
Figure 2:
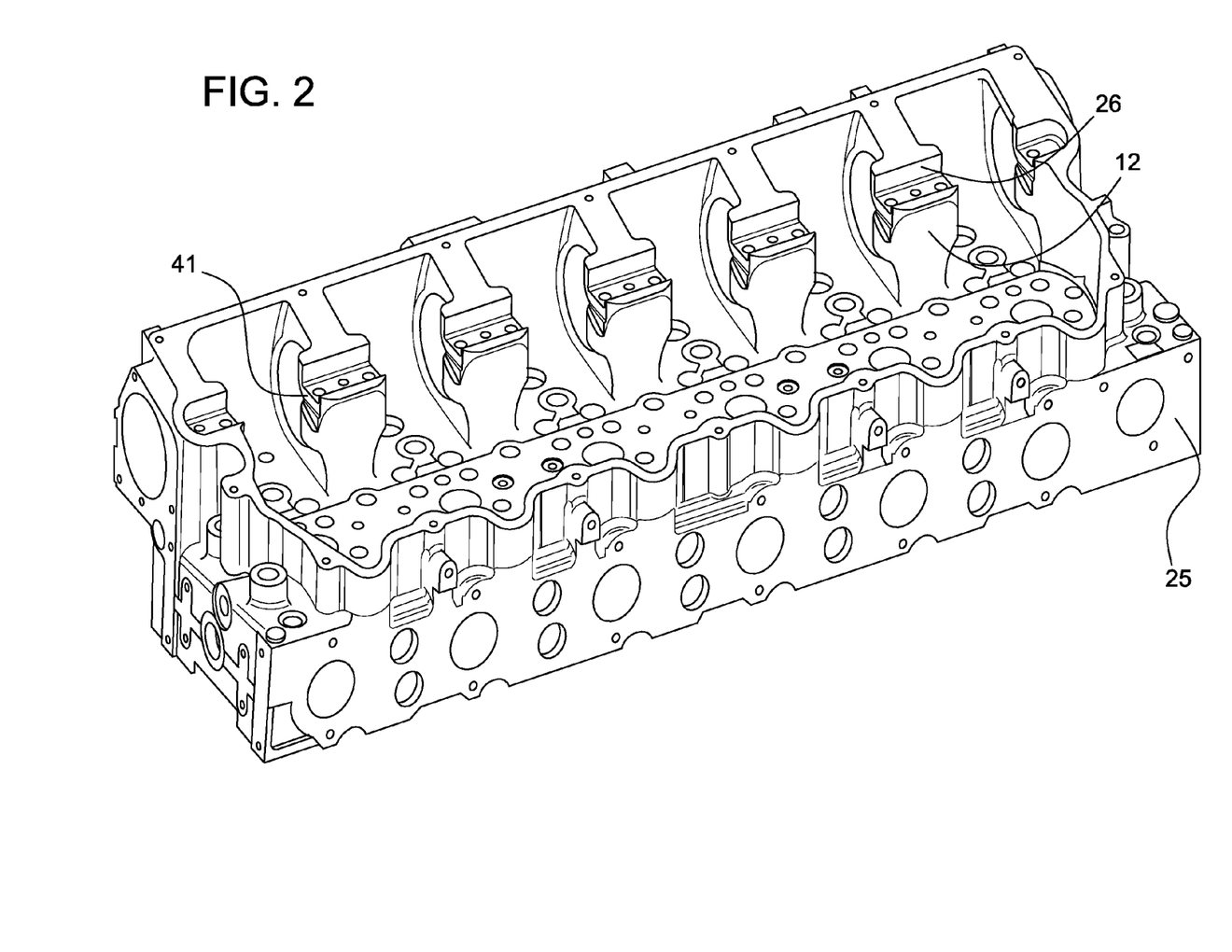
FIG. 2 is an isometric view of a cylinder head according to the disclosure.
Figure 3:
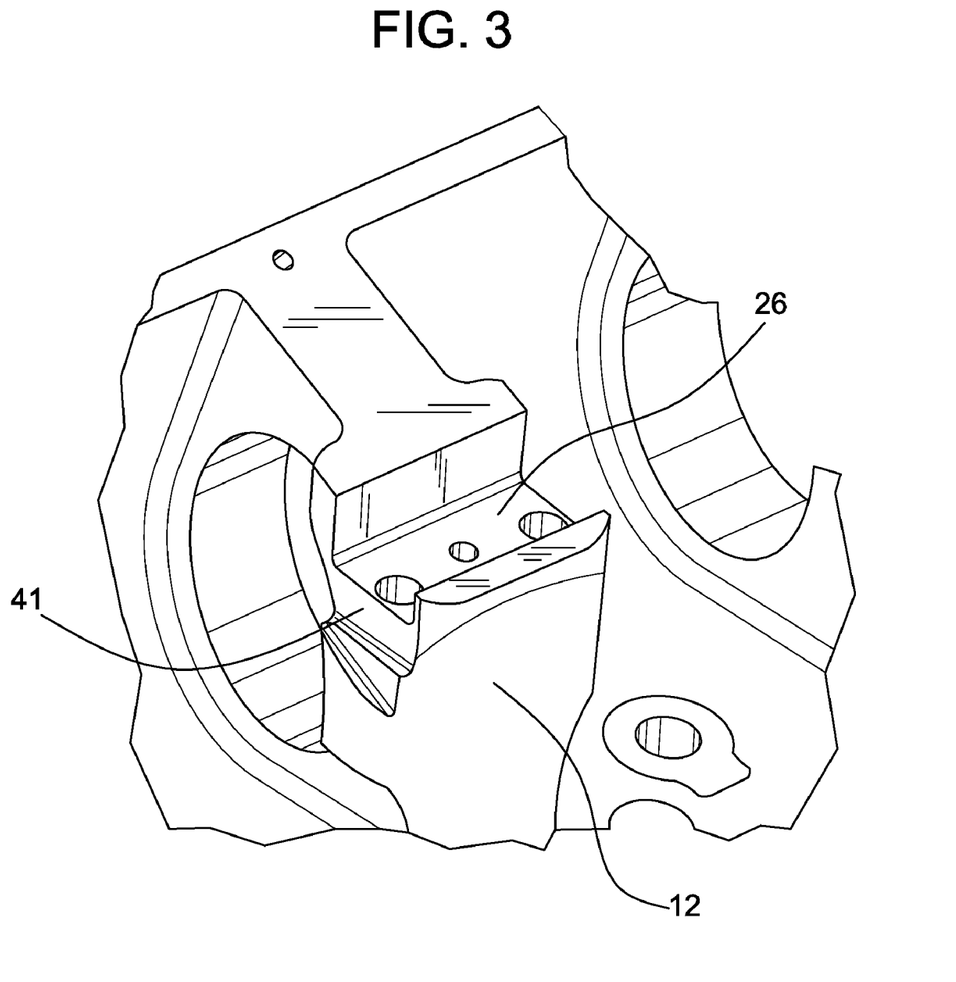
FIG. 3 is a fragmentary, enlarged isometric view of a machined rocker arm stand of the cylinder head of FIG. 2.

Turning now to FIG. 1, there is shown a cylinder head 10 having a plurality of upright rocker arm stands 12 that support an elongated rocker arm shaft 14. The cylinder head 10 may be utilized in an internal combustion engine 15, such as, for example, an overhead cam engine, which is utilized, for example in a machine. The term "machine" may refer to any machine that performs some type of operation associated with an industry such as mining, construction, farming, transportation, or any other industry known in the art.

The cylinder head 10 may be fabricated by any appropriate method, such as casting or machining. In the illustrated embodiment, the upright rocker arm stands 12 are cast as an integral part of the cylinder head 10 and then machined to provide the desired dimensions of a recessed rocker valley 16 into which the rocker arm shaft 14 is received.

In the illustrated embodiment, the shaft 14 is secured to the rocker arm stands 12 by a plurality of bolts 18 that extend through bores 20 in the shaft 14 and are received in bores 22 in the rocker arm stands 12, although the shaft may alternately be provided with a defined range of rotation. Lubricant may be supplied to the interface between the shaft 14 and the rocker arm stands 12 through one or more bores 23 in the rocker arm stands 12. Rocker arms 24 are provided along the rocker arm shaft 14. While only a few of the rocker arms 24 are illustrated, rocker arms 24 are typically provided along either side of each rocker arm stand 12.

Referring to the remainder of the drawings, this disclosure relates to a method of remanufacturing damaged or worn rocker arm stands 12, and the resulting remanufactured cylinder head 25 and rocker arm stand 12 arrangement, and an insert 28 for use in repairing a rocker arm stand 12 of a cylinder head 10.

According to a disclosed method, the rocker valley 16 of the damaged or worn rocker arm stand 12 is machined to form a channel 26 adapted to receive the saddle insert 28 (see FIGS. 2-7). The saddle insert 28 generally includes an outer facing surface 30 contoured to follow the channel 26, and an inner facing surface 32 that, when the saddle insert 28 is disposed within the channel 26 in the rocker arm stand 12, is disposed and adapted to receive the rocker arm shaft 14.

Figure 4:
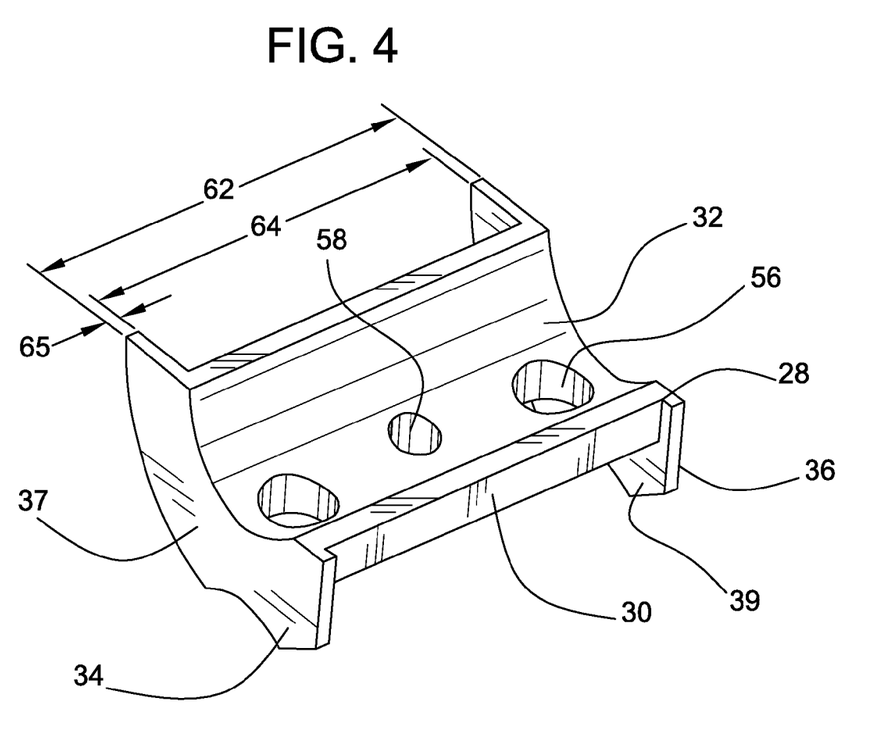
FIG. 4 is an isometric view of an insert and the machined rocker arm stand of FIG. 3.
Figure 5:
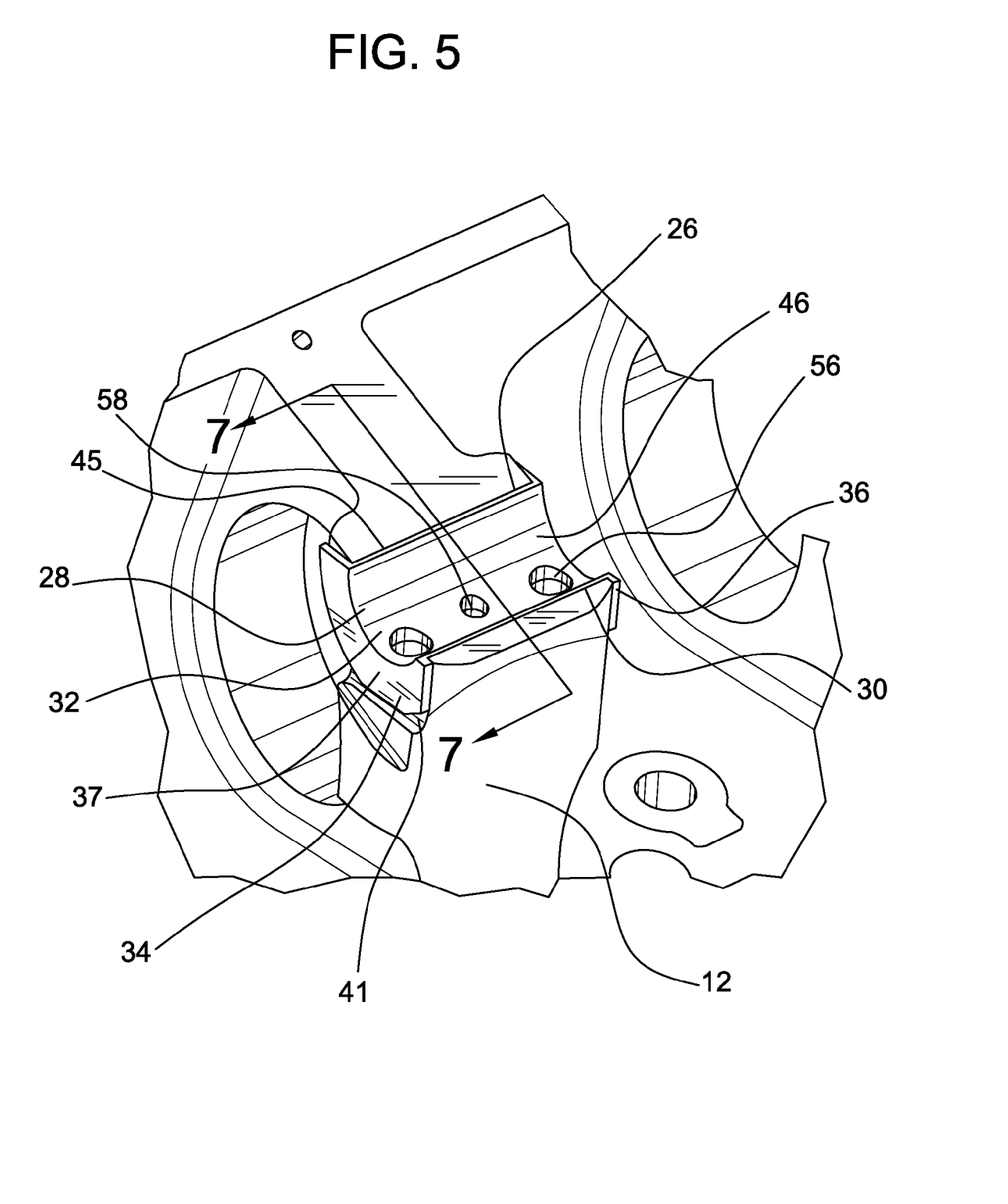
FIG. 5 is an isometric view of the insert and machined rocker arm stand of FIG. 4 with the insert installed.
Figure 6:
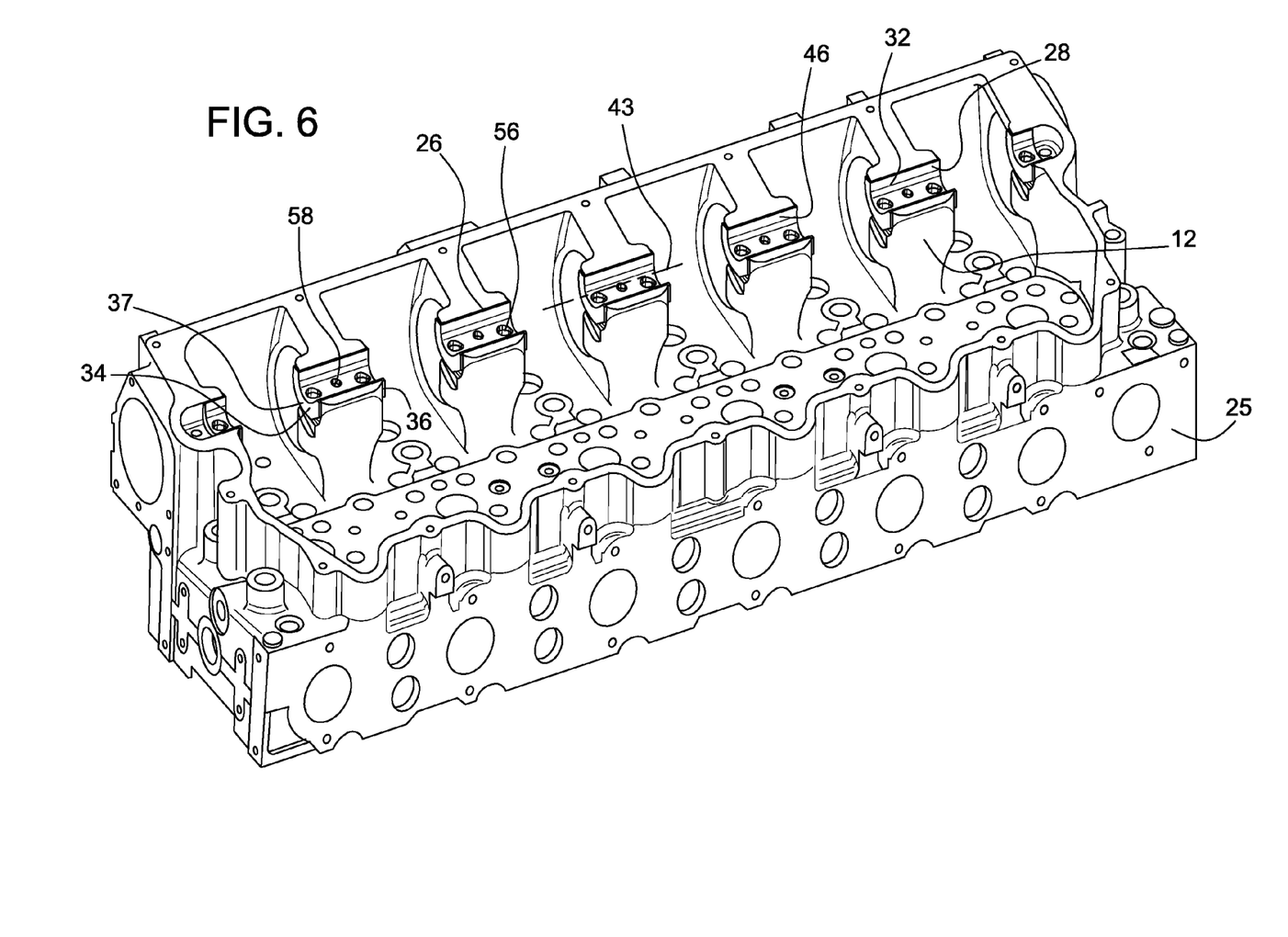
FIG. 6 is an isometric view of a cylinder head with inserts according to the disclosure.

In the illustrated embodiment, the saddle insert 28 additionally includes a pair of wings or flanges 34, 36 that are disposed along either side of the rocker arm stand 12 when the saddle insert 28 is disposed within the channel 26. Outer faces 37 of the flanges 34, 36 are disposed toward the rocker arms 24, while inner faces 39 of the flanges 34, 36 are disposed toward side faces 41 of the rocker arm stand 12. In an embodiment of the saddle insert 28, the flanges 34, 36 are substantially rectangular, although they may have an alternate shape. An embodiment of the method may include machining the side faces 41 of the rocker arm stand 12 to provide a complementary fit with the inner face of the flange 34, 36. In this way, the flanges 34, 36 not only assist in positioning the saddle insert 28, but they also rebuild damaged or worn side surfaces of the rocker arm stand 12. Further, the flanges 34, 36 may assist in reducing wear at the interface between the saddle insert 28 and the rocker arm stand 12 substantially adjacent the channel 26.

The side faces 41 may be disposed generally in a plane substantially normal to an axis 43 extending through the rock arm shaft 14, or at an alternate angle thereto, so long as the side faces 41 allow the saddle insert 28 to slide down over the rocker arm stand 12. The outer faces 37 of the flanges 34, 36 will typically be disposed in a plane that extends substantially normal to the axis 43, so as not to interfere with the movement of the rocker arms 24, while the inner faces 39 of the flanges 34, 36 will generally correspond to the angle of the side faces 41 of the rocker arm stand 12.

According to the disclosed method, a retention substance, such as a retention compound or substance 45, is disposed along the outer surface 30 of the saddle insert 28 and/or the surface of the channel 26, and the saddle insert 28 is installed into the channel 26 by way of press fitting or other appropriate assembly method. The retention compound or substance 45 may be a liquid, solid or other form of retention compound or substance, and may be cured or otherwise set.

The inner facing surface 32 of the installed saddle insert 28 is then machined to provide an appropriate rocker valley 46 for receiving and supporting the rocker arm shaft 14. If necessary, the outer faces 37 of the flanges 34, 36 may likewise be machined to an appropriate dimension.

While the channel 26 is illustrated as a rectangular structure, those of skill will appreciate that the channel 26 may be of an alternate design, so long as the channel 26 securely receives the saddle insert 28 when installed. Similarly, the saddle insert 28 may be of an alternate design, particularly along its outer surface 30, so long as it is contoured to follow the adjacent channel 26 and provide a secure fitment when installed.

Returning to FIG. 4, the saddle insert 28 may also include one or more openings or bores 56 for receiving a bolt 18, such as is illustrated in FIG. 1. In this way, the bolt 18 would extend through the bore 20 in the shaft 14 and the bore 56 in the saddle insert 28, and be received in the bore 22 in the rocker arm stand 12. The saddle insert 28 may also include one or more openings or bores 58 for the passage of lubricant. In the illustrated embodiment, the bore 58 aligns with the corresponding bore 23 in the rocker arm stand 12 visible in FIG. 3. In this way, in use, lubricant is permitted to pass through the bores 58, 23 to the interface between the shaft 14 and the saddle insert 28.

Figure 7:
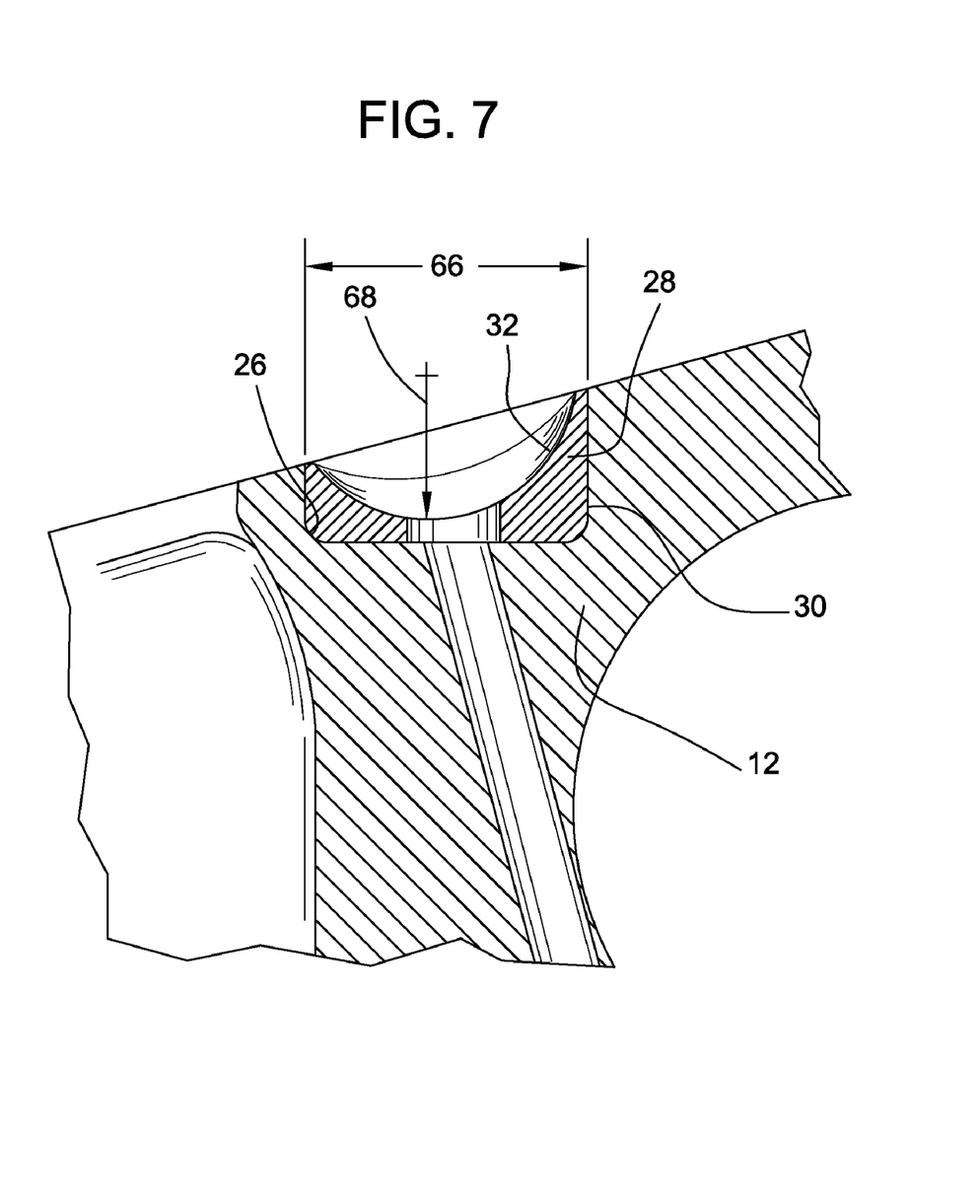
FIG. 7 is a cross-sectional view of the insert and machined rocker arm stand taken along line 7-7 in FIG. 5.

While the particular dimensions may vary, in an embodiment of the saddle insert 28, the length 62 of the saddle insert 28 between the outer faces 37 of the flanges 34, 36, that is, along the inner facing surface 32, is on the order of 70 to 103 mm, although it may be greater or lesser than this dimension. In an embodiment, the length 62 is on the order of 70 to 90 mm; in another embodiment, the length 62 is on the order of 75 to 85 mm; and in yet another embodiment, the length 62 is on the order of 78 to 83 mm. In an embodiment, the length 62 is on the order of 83 to 103 mm; in another embodiment, the length 62 is on the order of 88 to 98 mm; and in yet another embodiment, the length 62 is on the order of 91 to 96 mm.

In an embodiment of the saddle insert 28, the distance 64 along the outer facing surface 30 of the saddle insert 28 between the inner faces 39 of the flanges 34, 36 is on the order of 65 to 97 mm, although it may be greater or lesser than this dimension. In an embodiment, the length 64 is on the order of 65 to 85 mm; in another embodiment, the length 64 is on the order of 70 to 80 mm; and in yet another embodiment, the length 64 is on the order of 72 to 77 mm. In an embodiment, the length 64 is on the order of 77 to 97 mm; in another embodiment, the length 64 is on the order of 82 to 92 mm; in yet another embodiment, the length 64 is on the order of 85 to 89 mm.

Accordingly, in an embodiment of the saddle insert 28, the thickness 65 of the flanges 34, 36 is on the order of 1.5 to 6 mm, although it may be greater or lesser than this dimension. In another embodiment, the thickness 65 is on the order of 2 to 4 mm. In yet another embodiment, the thickness 65 is on the order of 3 mm, with conventional manufacturing tolerances.

In an embodiment of the saddle insert 28, the distance 66 between the sides of the outer facing surface 30 is on the order of 33 to 43 mm, although it may be greater or lesser than this dimension. In an embodiment, the distance 66 is on the order of 36 to 40 mm.

In an embodiment of the saddle insert 28, the radius 68 of the rocker valley 46, that is, the machined inner facing surface 32 of the saddle insert 28, is on the order of 35 to 45 mm, although it may be greater or lesser than this dimension. In an embodiment, the radius 68 is on the order of 38 to 42 mm.

INDUSTRIAL APPLICABILITY

The present disclosure is applicable to a range of cylinder heads, whether cast or machined. The arrangement and/or method may be utilized, for example, in an overhead cam cylinder head casting. An engine including the arrangement may be utilized in a machine, be it a stationary or a movable machine, such as, for example, any machine that performs some type of operation associated with an industry such as mining, construction, farming, transportation, or any other industry known in the art.

The durability of the disclosed arrangement utilized in a cast cylinder head may result in enhanced durability and wear properties when a hardened steel saddle insert is utilized inasmuch as a hardened steel rocker arm shaft would then wear against the hardened steel saddle insert, as opposed to the cast cylinder head.

The disclosed arrangement and/or method may be useful to prolong the life of a machined or cast cylinder head. Accordingly, the arrangement and/or method may result in concomitant savings in part costs as well as labor. The arrangement and/or method may additionally reduce scrap, thus presenting a greener solution to engine repair.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. An insert for use in a remanufactured cylinder head for an internal combustion engine, the cylinder head being adapted to receive a rocker arm shaft to which at least one rocker arm is mounted, the cylinder head comprising at least one rocker arm stand including a channel, the insert being adapted to be secured within the channel, the insert comprising an inner facing surface for receiving the rocker arm shaft, the inner facing surface having a radius and a length, the radius being within a range of 35 to 45 mm, the length being within a range of 70 to 103 mm.

an outer facing surface, at least a portion of the outer facing surface being adapted for disposal against the channel, the outer facing surface being adapted to cover a surface of the rocker arm stand such that the rocker arm shaft is disposed adjacent the inner facing surface in use, but not adjacent the rocker arm stand.

2. The insert of claim 1 wherein the radius is within a range 38 to 42 mm.

3. The insert of claim 1 wherein the length is within a range of 75 to 85 mm.

4. The insert of claim 3 wherein the length is within a range of 78 to 83 mm.

5. The insert of claim 1 wherein the length is within a range of 88 to 98 mm.

6. The insert of claim 5 wherein the length is within a range of 91 to 96 mm.

7. The insert of claim 1 further comprising opposed flanges disposed along opposite ends of the length of inner facing surface of the insert, the flanges including inner faces adapted to be at least partially disposed against side of the rocker arm stand, and outer faces adapted to be disposed toward the rocker arms in use.

8. The insert of claim 7 wherein the inner faces of the flanges are separated by a distance along the outer facing surface of the insert, the distance between the inner faces being within a range of 65 to 97 mm.

9. The insert of claim 8 wherein the distance between the inner faces is within a range of 70 to 80 mm.

10. The insert of claim 9 wherein the distance between the inner faces is within a range of 72 to 77 mm.

11. The insert of claim 8 wherein the distance between the inner faces is within a range of 82 to 92 mm.

12. The insert of claim 11 wherein the distance between the inner faces is within a range of 85 to 89 mm.

13. The insert of claim 1 wherein at least a portion of the outer facing surface is substantially rectangular, and has sides, a distance between the sides of the outer facing surface being within a range of 33 to 43 mm.

14. The insert of claim 13 wherein the distance between the sides of the outer facing surface is within a range of 36 to 40 mm.

15. The insert of claim 7 wherein the flanges have a thickness within the range of 2 to 4 mm.

16. The insert of claim 10 wherein the length of the inner facing surface is within a range of 78 to 83 mm.

17. The insert of claim 12 wherein the length of the inner facing surface is within a range of 91 to 96 mm.

18. The insert of claim 8 wherein at least a portion of the outer facing surface is substantially rectangular, and has sides, a distance between the sides of the outer facing surface being within a range of 33 to 43 mm.

19. The insert of claim 7 wherein the inner facing surface of the insert has an axis from which the radius extends, and the flanges extend substantially normal to the axis.

20. The insert of claim 1 formed of hardened steel.

* * * * *